Patented Oct. 20, 1931

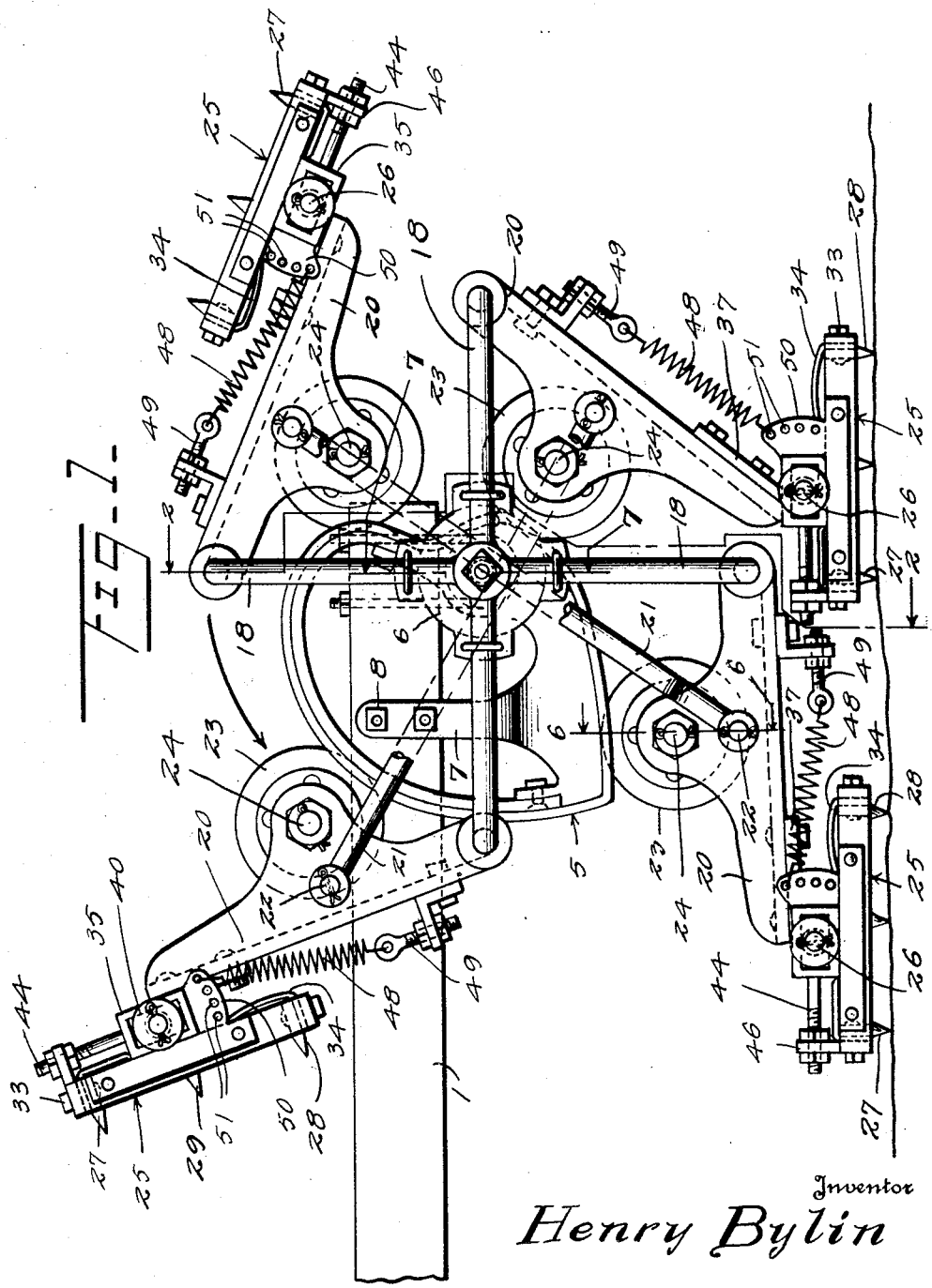

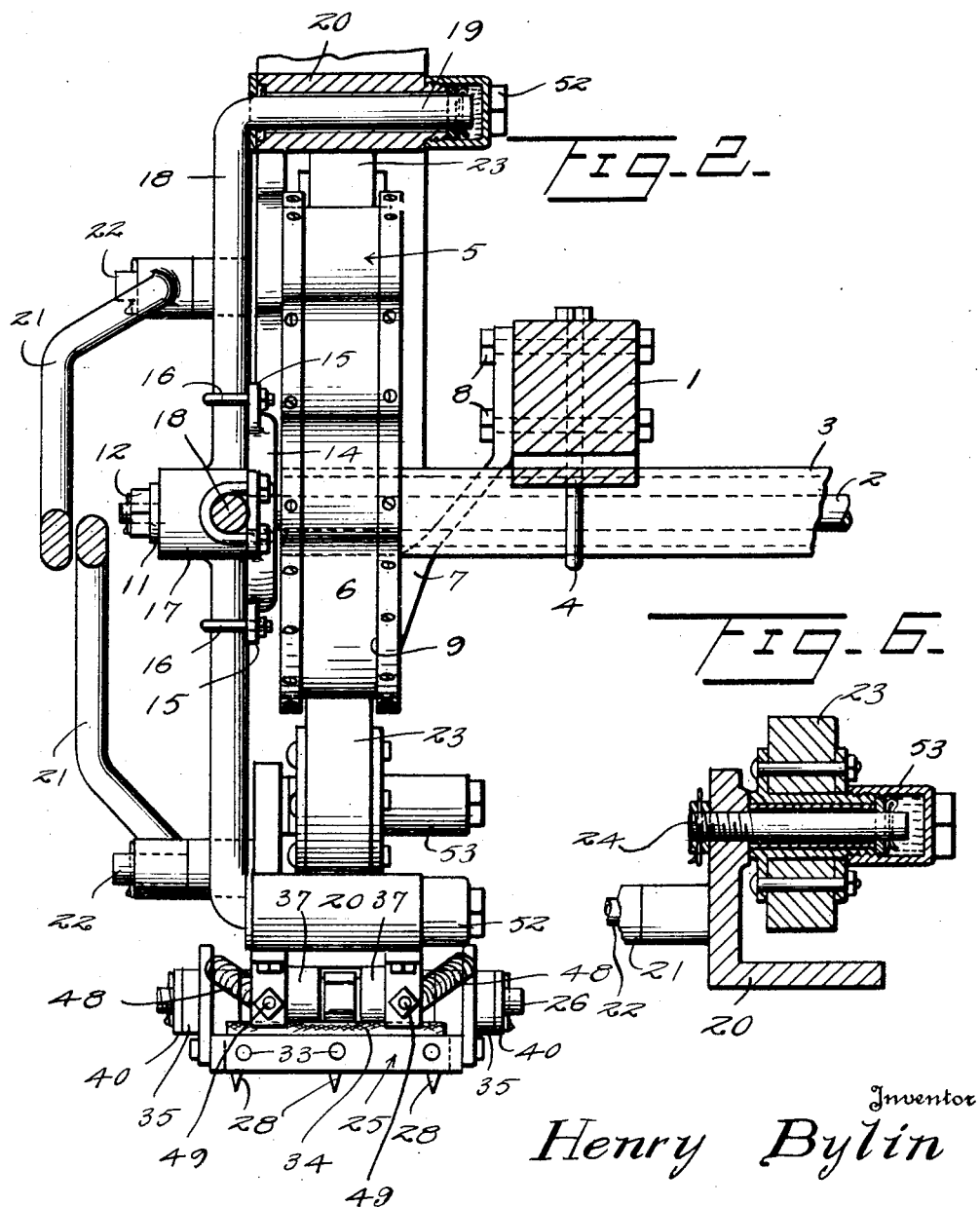

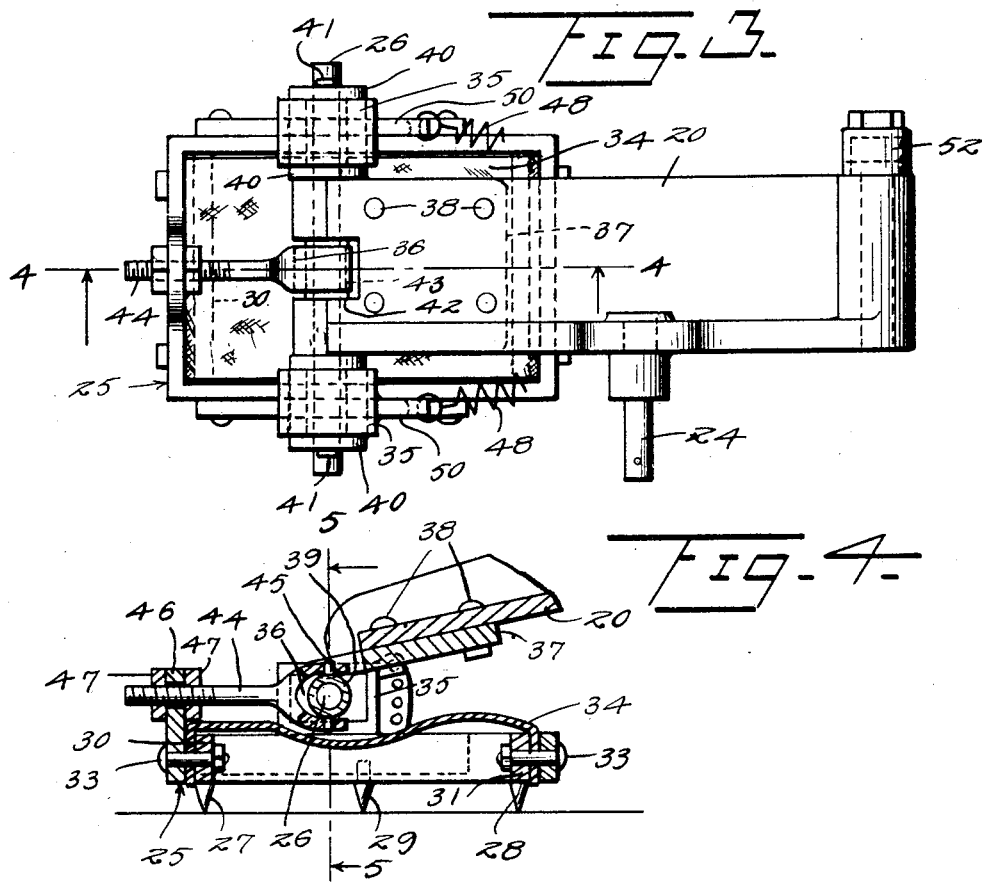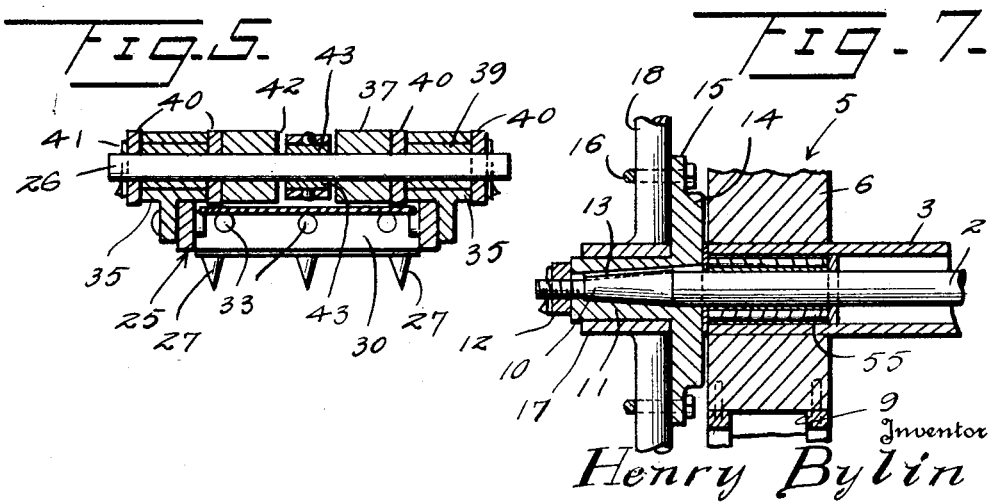

1,827,730

UNITED STATES PATENT OFFICE

HENRY BYLIN, OF LANKIN, NORTH DAKOTA

TRACTION WHEEL

Application filed May 2, 1931. Serial No. 534,629.

This invention relates to traction wheels of that type known as steppers, and has for one of its objects to improve and simplify the general construction of tractor wheels of this character and to provide one which will require the expenditure of comparatively little power for its operation, which will operate as effectively in snow and sand as well as on hard ground, and which will impart comparatively little vibration to the machine of which it forms a part.

The invention resides in the construction, combination and arrangement of parts, hereinafter fully described and claimed, and illustrated in the accompanying drawings, wherein:—

Figure 1 is a view in side elevation of a traction wheel constructed in accordance with my invention.

Figure 2 is a sectional view taken on the vertical planes indicated by the line 2—2 of Figure 1.

Figure 3 is a top plan view of one of the shoes of the traction wheel and the carrying lever for the shoe.

Figure 4 is a sectional view taken on the vertical plane indicated by the line 4—4 of Figure 3.

Figure 5 is a sectional view taken on the vertical plane indicated by the line 5—5 of Figure 4.

Figure 6 is a sectional view taken on the vertical plane indicated by the line 6—6 of Figure 1, and Figure 7 is a sectional view taken on the vertical plane indicated by the line 7—7 of Figure 1.

Referring in detail to the drawings, 1 designates one of the side bars or beams of a motor propelled vehicle of any type, 2 designates the rear or driving axle of the machine, 3 the housing for the axle, and 4 the means by which the beam and housing are secured together.

The traction wheel comprises a cam 5 which is of open formation and embodies a hub 6 positioned upon the outer end portion of the axle housing 3. The cam 5 also embodies an arm 7 which is secured, as at 8, to the beam 1 and which together with the hub 6 functions to hold the cam against rotation with respect to the axle housing 3. The cam 5 is substantially of the heart shape type, and is provided in its periphery with a groove 9.

The axle 2 extends outwardly beyond the housing 3 and the cam hub 6, and is provided at such end thereof with a spindle 10. A boxing 11 is secured to the axle spindle 10 by a nut 12, and is keyed, as at 13, to the axle spindle. The boxing 11 is provided at its inner end with a disk 14 which is provided at its periphery with lugs or ears 15 carrying U-bolts 16. A sleeve 17 is mounted upon the boxing 11, and radiating therefrom are arms 18. The sleeve 17 is secured to the boxing 11 against lateral displacement therefrom and for rotation therewith by the disk 14 and the bolts 16 which latter embrace the arms 18. The arms 18 are provided with spindles 19 which extend inwardly therefrom and to which are pivoted levers 20.

The levers 20 are terminally pivoted to the arm spindles 19, and are arranged in oppositely disposed coacting pairs. The levers of each pair are connected by links 21 which are connected, as at 22, to the levers at points centrally between the ends of the latter and which are free of connection with the arms 18.

Rollers 23 journaled, as at 24, at the transverse centers of the levers 20, contact with the periphery of the cam 5. The links 21 maintain the levers 20 in such positions with respect to the cam 5 as to hold the rollers 23 constantly in contact with the cam. The rollers 23 travel in the cam groove 9, and due thereto hold the levers 20 against inward or outward lateral movement on the arm spindles 19.

Shoes or treads 25 are pivoted, as at 26, to the free ends of the levers 20. The shoes 25 are in the form of open frames and are of elongated rectangular formation in plan. The shoes 25 are provided with front calks 27, rear calks 28 and intermediate calks 29, the front and rear calks being carried by bars 30 and 31, respectively, which extend transversely of the shoes 25 and are secured to the end bars of the shoes by bolts 33. Flexible members 34 which may be made from canvas or other suitable material, extend from end to end and from side to side of the shoes 25.

The shoes 25 are provided at opposite sides thereof with bearing lugs 35 which have elongated openings 36 for the reception of the pivots 26. The pivots 26 are carried by bearing brackets 37 secured, as at 38, to the levers 20, and are provided with bushings 39 which pass through and contact with the bearing lugs 35. Washers 40 mounted upon the pivots 26 at opposite sides of the bearing lugs 35, hold the bushings 39 within the bearing lugs, the outer washers being held in place by keys 41 and the inner washers being held in place by the bearing brackets 37 which latter are arranged between the bearing lugs, and provided with central openings 42. Collars 43 are loosely mounted upon the pivots 26 within the openings 42 of the bearing brackets 37. Bolts 44 have forked ends pivotally connected, as at 45, to the collars 43, and pass through lugs 46 carried by certain ends of the shoes 25.

Nuts 47 are mounted on the bolts 44 and contact with the opposite sides of the lugs 46. The pivots 26 extend transversely of the shoes 25, and the shoes extend in opposite directions beyond the pivots. The collars 43, bolts 44, lugs 46 and nuts 47 provide means by which the shoes 25 may be adjusted on their pivots 26 to vary the extension of their projections in either direction beyond the pivots. Springs 48 secured by bolts 49 to the levers 20, and secured to lugs 50 carried by the shoes 25, constantly tend to maintain the shoes in parallel relation to the levers. The bolts 49 are adjustable on the levers 20, and the lugs 50 are each provided with a series of openings 51 into selective ones of which the springs 48 may be engaged, to the end that the tension of the springs may be varied.

Provision is made for lubricating the arm spindles 19 and the roller spindles 24 by providing the levers 20 with grease cups 52 and the rollers with grease cups 53. The outer end of the axle 2 is supported from its housing 3 by a bearing 55.

In practice, the arms 18, the levers 20 and the shoes 25 are rotated with respect to the cam 5 by the axle 2. The levers 20 and the shoes 25 rotate about the cam 5 in the direction indicated by the arrow of Figure 1. The levers 20 are held by the links 21 in such relation to the cam 5 as to constantly maintain the rollers 23 in contact with the periphery of the cam. The shoes 25 move successively into and out of engagement with the ground. Two of the shoes 25 are always in engagement with the ground, and these shoes are arranged one in advance of the other. As the lowermost of these two shoes 25 moves out of engagement with the ground, another shoe moves into engagement with the ground in advance of the foremost of the two shoes.

The lower peripheral portion of the cam 5 is struck on a greater radius than the upper peripheral portion thereof. The front and longer part of the lower peripheral portion of the cam 5 curves downwardly and forwardly from a point in advance of the vertical axis of the axle 2, and the rearward and shorter part of this peripheral portion curves upwardly and rearwardly from such point. When that arm 18, to which is connected that shoe 25 approaching the ground, occupies a position coincident with the vertical axis of the axle 2, the roller 23 of the lever 20 connecting the shoe to the arm is in contact with the front end of the lower peripheral portion of the cam 5, and the shoe is in full engagement with the ground with the lever extending forwardly from the lower end of the arm in a substantially right angular position with respect thereto. In view of this position of this lever 20, the shoe 25 thereof will be held by its spring 48 in full engagement with the ground. As this roller 23 moves rearwardly along the lower peripheral portion of the cam 5, this lever 20 rocks upwardly and forwardly on this shoe 25. During this travel of this roller 23 the spring 48 connecting this lever 20 and shoe 25 is tensioned, and when this roller contacts with the rear part of the lower peripheral portion of the cam 5, this shoe is rocked upwardly on its pivotal connection with the levers. It will thus be seen that each of the shoes 25 is while in active position engaged throughout its entire length and width with the ground, with the result that a substantial traction effect will be produced. It will be further understood that during the final period of the engagement of the shoe with the ground each shoe will move readily out of engagement with the ground. The flexible members 34 of the shoes adapt the wheel for use in snow, sand and the like, such members preventing the passage of snow, sand and the like through the shoes.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A traction wheel comprising a cam, arms rotatable with respect to the cam, pairs of opposed levers surrounding the cam and pivoted at corresponding ends thereof to the arms, rollers carried by the levers and contacting with the cam, links connecting the levers of each pair, shoes pivoted to the free ends of the levers, and springs connecting the levers and shoes.

2. A traction wheel comprising a cam, arms rotatable with respect to the cam, pairs of opposed levers surrounding the cam and pivotally connected at corresponding ends thereof to the arms, rollers carried by the levers and contacting with the cam, links connecting the levers of each pair and connected to the levers at points between the ends of the latter, shoes pivoted to the free ends of the levers, and springs connecting the levers and shoes.

3. A traction wheel comprising a cam, arms rotatable with respect to the cam, levers surrounding the cam and pivoted at corresponding ends thereof to the arms, rollers carried by the levers and contacting with the cam, means maintaining the levers in position to hold the rollers in contact with the cam, pivots carried by the free ends of the levers, shoes mounted on the pivots for adjustment with respect thereto, means securing the shoes in adjusted position with respect to their pivots, and springs connecting the levers and the shoes.

4. A traction wheel comprising a cam, arms rotatable with respect to the cam, levers surrounding the cam and pivoted at corresponding ends thereof to the arms, rollers carried by the levers and contacting with the cam, means holding the levers in a position to maintain the rollers in contact with the cam, pivots carried by the free ends of the levers, shoes adjustably mounted upon the pivots, means connected to the pivots and shoes for adjusting the shoes and holding them in adjusted position, and springs connecting the levers and the shoes.

5. A traction wheel comprising a cam, arms rotatable with respect to the cam, levers surrounding the cam and pivoted at corresponding ends thereof to the arms, rollers carried by the levers and contacting with the cam, means holding the levers in position to maintain the rollers in contact with the cam, open shoe frames pivoted to the free ends of the levers, flexible members carried by and closing the open frames, and springs connecting the frames and levers.

In testimony whereof I hereunto affix my signature.

HENRY BYLIN.